(12) United States Patent
Uchimoto

(10) Patent No.: US 10,714,976 B2
(45) Date of Patent: Jul. 14, 2020

(54) WIRELESS POWER RECEIVER

(71) Applicant: ROHM CO., LTD., Ukyo-Ku, Kyoto (JP)

(72) Inventor: Daisuke Uchimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 131 days.

(21) Appl. No.: 15/605,130

(22) Filed: May 25, 2017

(65) Prior Publication Data

US 2017/0346344 A1 Nov. 30, 2017

(30) Foreign Application Priority Data

May 27, 2016 (JP) .................................. 2016-106701

(51) Int. Cl.
| | | |
|---|---|---|
| *H02J 50/12* | (2016.01) | |
| *H02J 50/80* | (2016.01) | |
| *H02J 50/90* | (2016.01) | |
| *H02J 7/02* | (2016.01) | |

(52) U.S. Cl.
CPC .............. *H02J 50/12* (2016.02); *H02J 7/025* (2013.01); *H02J 50/80* (2016.02); *H02J 50/90* (2016.02)

(58) Field of Classification Search
CPC .. H02J 50/12; H02J 50/80; H02J 50/90; H02J 7/025
See application file for complete search history.

(56) References Cited

U.S. PATENT DOCUMENTS

| | | | | | |
|---|---|---|---|---|---|
| 2010/0164295 A1* | 7/2010 | Ichikawa | ................ | H02J 50/12 | |
| | | | | 307/104 | |
| 2011/0148215 A1* | 6/2011 | Marzetta | ................ | H02J 5/005 | |
| | | | | 307/104 | |
| 2013/0260676 A1* | 10/2013 | Singh | ................... | H04B 5/0037 | |
| | | | | 455/41.1 | |
| 2015/0008755 A1* | 1/2015 | Sone | ....................... | H02J 5/005 | |
| | | | | 307/104 | |
| 2015/0108847 A1* | 4/2015 | Taylor | ..................... | H02J 50/60 | |
| | | | | 307/104 | |
| 2015/0244176 A1* | 8/2015 | Van Den Brink | ...... | H02J 5/005 | |
| | | | | 307/104 | |
| 2015/0372662 A1* | 12/2015 | Niessen | ................ | H03H 11/04 | |
| | | | | 307/104 | |

FOREIGN PATENT DOCUMENTS

| | | | |
|---|---|---|---|
| JP | 2011211780 A | 10/2011 | |
| JP | 2015012761 A | 1/2015 | |
| JP | 2015537495 A | 12/2015 | |
| JP | 2016025702 A | 2/2016 | |
| WO | 2014039088 A1 | 3/2014 | |

OTHER PUBLICATIONS

JPO Notice of Reasons for Refusal corresponding to JP Patent Application No. 2016-106701; dated Mar. 17, 2020.

* cited by examiner

*Primary Examiner* — Rexford N Barnie
*Assistant Examiner* — Elim Ortiz
(74) *Attorney, Agent, or Firm* — Cantor Colburn LLP

(57) ABSTRACT

A reception antenna includes a reception coil which receives a power signal. A rectification circuit rectifies an alternating current flowing to the reception antenna. A smoothing capacitor smoothes an output of the rectification circuit. A waveform stabilizer is enabled when a power receiver satisfies a predetermined condition and shifts a parallel resonance frequency of the reception antenna.

14 Claims, 12 Drawing Sheets

WIRELESS POWER RECEIVER

CROSS-REFERENCE TO RELATED APPLICATIONS

The present invention claims priority under 35 U.S.C. § 119 to Japanese Patent Application No. 2016-106701, filed May 27, 2016, the entire contents of which are incorporated herein by reference.

BACKGROUND OF THE INVENTION

1. Field of the Invention

The present invention relates to wireless power supply technology.

2. Description of the Related Art

Recently, contactless power transmission (also referred to as contactless power supply or wireless power supply) begins to spread to supply power to an electronic apparatus. A wireless power consortium (WPC) is organized to promote mutual use between products of different makers and a Qi standard to be an international standard is formulated by WPC.

FIG. 1 is a diagram illustrating a configuration of a wireless power supply system 100 corresponding to the Qi standard. The power supply system 100 includes a power transmitter (TX) 200 and a power receiver (RX) 300r. The power receiver 300r is mounted on an electronic apparatus such as a mobile phone terminal, a smart phone, an audio player, a game machine, and a tablet terminal.

The power transmitter 200 includes a transmission antenna 201, an inverter 204, a controller 206, and a demodulator 208. The transmission antenna 201 includes a transmission coil (primary coil) 202 and a resonance capacitor 203. The inverter 204 includes an H bridge circuit (full bridge circuit) or a half bridge circuit, a drive signal S1, specifically, a pulse signal is applied to the transmission coil 202, and an electromagnetic field power signal S2 is generated in the transmission coil 202 by a drive current flowing to the transmission coil 202. The controller 206 controls the whole power transmitter 200 generally. Specifically, the controller 206 controls a switching frequency of the inverter 204, a duty ratio of switching, or a phase and changes transmission power.

In the Qi standard, a communication protocol is determined between the power transmitter 200 and the power receiver 300r and control data S3 can be transferred from the power receiver 300r to the power transmitter 200. The control data S3 is amplitude-modulated (AM-modulated) using backscattering modulation and is transmitted from a reception coil 302 (secondary coil) to the transmission coil 202. The control data S3 includes power control data (also referred to as packets) indicating a power supply amount for the power receiver 300r and data showing unique information of the power receiver 300r. The demodulator 208 demodulates the control data S3 included in an electric current or a voltage of the transmission coil 202. The controller 206 controls the inverter 204, on the basis of the power control data included in the demodulated control data S3.

The power receiver 300r includes the reception coil 302, a rectification circuit 304, a capacitor 306, a modulator 308, a main controller, a power supply circuit 314, and a demodulator 320. The reception coil 302 receives the power signal S2 from the transmission coil 202 and transmits the control data S3 to the transmission coil 202. The rectification circuit 304 and the capacitor 306 rectify/smooth an electric current S4 induced in the reception coil 302 according to the power signal S2 and convert the current S4 into a direct-current (DC) voltage $V_{RECT}$. The power supply circuit 314 stabilizes the DC voltage $V_{RECT}$ and generates an output voltage $V_{OUT}$. The output voltage $V_{OUT}$ is supplied to a load circuit not illustrated in the drawings.

The main controller monitors the power supply amount received by the power receiver 300r and generates power control data (control error value) indicating the power supply amount, according to the power supply amount. The modulator 308 modulates the control data S3 including the power control data, modulates a coil current of the reception coil 302, and modulates a coil current and a coil voltage of the transmission coil 202.

In the Qi standard, control data S5 can be transferred from the power transmitter 200 to the power receiver 300r. The control data S5 is superimposed on the power signal S2 by frequency shift keying (FSK) and is transmitted from the transmission coil 202 to the reception coil 302. The control data S5 can include an acknowledgement (ACK) signal giving notice of reception of the control data S3 and a non-acknowledgement (NACK) signal giving notice of non-reception of the control data S3.

The FSK modulator 220 is embedded in the controller 206 and changes the switching frequency of the inverter 204 according to data to be transmitted. The demodulator 320 of the side of the power receiver 300r demodulates the FSK control data (also referred to as a FSK signal) S5.

FIG. 2 is a circuit diagram of the rectification circuit 304 and the demodulator 320 examined by the present inventors. The rectification circuit 304 is a so-called synchronous rectification circuit (also referred to as a synchronous detection circuit) and includes an H bridge circuit 330, a driver 332, a first comparator 334, a second comparator 336, and a logic circuit 338. The H bridge circuit 330 includes transistors M1 to M4 and rectification diodes D1 to D4.

A reception antenna 301 is connected to alternating-current (AC) input terminals AC1 and AC2 of the rectification circuit 304 and an alternating current (AC) $I_{AC}$ (S4 of FIG. 1) induced by the power signal S2 flows through the terminals AC1 and AC2. The rectification circuit 304 switches a state φ of the H bridge circuit 330 at timing when the AC $I_{AC}$ is zero, that is, a polarity is inverted. This is called zero current switching. The H bridge circuit 330 can take the following four states φ1 to φ4.

First state φ1
   First transistor M1=ON
   Second transistor M2=OFF
   Third transistor M3=OFF
   Fourth transistor M4=ON
Second state φ2
   First transistor M1=OFF
   Second transistor M2=OFF
   Third transistor M3=OFF
   Fourth transistor M4=OFF
Third state φ3
   First transistor M1=OFF
   Second transistor M2=ON
   Third transistor M3=ON
   Fourth transistor M4=OFF
Fourth state φ4
   First transistor M1=OFF
   Second transistor M2=OFF Third transistor M3=OFF Fourth transistor M4=OFF In the second state φ2 and the fourth state φ4, the rectification circuit 304 functions as a diode rectification circuit.

The first comparator 334 and the second comparator 336 compare voltages $V_{AC1}$ and $V_{AC2}$ of the AC1 terminal and the AC2 terminal with threshold voltages $V_{ZC1}$ and $V_{ZC2}$ for zero current detection, respectively. The comparators 334 and 336 are hysteresis comparators and the threshold voltages change with two values of a negative voltage (for example, −0.2 V) and a voltage (for example, −2 mV) near 0.

The logic circuit 338 controls the state of the H bridge circuit 330, on the basis of a combination of outputs AC1_DET and AC2_DET of the first and second comparators 334 and 336. The driver 332 drives the transistors M1 to M4, according to a control signal from the logic circuit 338. All contents of the configuration and the operation of the rectification circuit 304 of FIG. 2 described herein are not recognized as known technology.

FIG. 3 is an operation waveform diagram of the rectification circuit 304. A vertical axis and a horizontal axis of each waveform diagram or time chart in the present specification are appropriately expanded or reduced to facilitate understanding and each waveform illustrated is also simplified, exaggerated, or highlighted to facilitate the understanding.

If the voltage $V_{AC1}$ of the AC1 terminal is more than −2 mV, a level of an AC1_DET signal changes to a high level and if the voltage $V_{AC1}$ of the AC1 terminal is lower than −0.2 V, the level of the AC1_DET signal changes to a low level. Likewise, if the voltage $V_{AC2}$ of the AC2 terminal is more than −2 mV, a level of an AC2_DET signal changes to a high level and if the voltage $V_{AC2}$ of the AC2 terminal is lower than −0.2 V, the level of the AC2_DET signal changes to a low level. The logic circuit 338 switches the first to fourth states φ1 to φ4, on the basis of the AC1_DET signal and the AC2_DET signal.

Returning to FIG. 2, the demodulator 320 will be described. A frequency of the AC2_DET signal is equal to a frequency of the AC $I_{AC}$, that is, the power signal S2. Therefore, the demodulator 320 counts a cycle of the AC2_DET signal, detects the frequency thereof, and performs FSK demodulation. Because the AC1 terminal and the AC2 terminal are symmetric, the demodulator 320 may perform the FSK demodulation, on the basis of the AC1_DET signal.

However, in the demodulator 320 of FIG. 2, the following problems occur.

The power transmitter 200 changes a transmission frequency and a duty ratio of switching and adjusts transmission power. Here, in mid power of the Qi standard, a full bridge inverter is provided at a transmission side and in addition to frequency control and duty ratio control, phase control is adopted to control the transmission power.

FIGS. 4A and 4B are operation waveform diagrams of the rectification circuit 304 of FIG. 2. According to an examination result from the present inventors, if a phase enters a certain region by the phase control, significant waveform breakage or ringing may occur sometimes in the voltages $V_{AC1}$ and $V_{AC2}$ of the AC1 terminal and the AC2 terminal between the second state φ2 and the fourth state φ4 in which the H bridge circuit becomes the diode rectification circuit. As illustrated in FIG. 4B, if amplitude of the waveform breakage or the ringing increases, the voltage $V_{AC1}$ ($V_{AC2}$) crosses the threshold voltage $V_{ZC}$ regardless of a zero crossing point of the AC $I_{AC}$ and the level of the AC1_DET signal (or the AC2_DET signal) changes. As a result, the frequency of the power signal S2 and the frequency of an AC1_DET1 signal (FSK_CLK_ID signal) are mismatched and a bit error rate is deteriorated. Or, the zero current switching of the H bridge circuit 330 may be deviated from an ideal state.

In addition, the waveform breakage and the ringing of the voltages $V_{AC1}$ and $V_{AC2}$ may occur regardless of the phase control.

SUMMARY OF THE INVENTION

The present invention has been made in view of the above problems and a general purpose thereof is to provide a wireless power receiver that can suppress waveform disturbance of two terminals of an H bridge circuit.

An embodiment of the present invention relates to a wireless power receiver structured to receive a power signal from a wireless power transmitter. The wireless power receiver includes a reception antenna having a reception coil structured to receive the power signal; a rectification circuit structured to rectify an alternating current flowing to the reception antenna; a smoothing capacitor structured to smooth an output of the rectification circuit; and a waveform stabilizer structured to be enabled when the wireless power receiver satisfies a predetermined condition and to shift a parallel resonance frequency of the reception antenna.

According to this embodiment, when there is the possibility that waveform disturbance occurs in voltage waveforms of alternating-current input terminals of the rectification circuit, the waveform disturbance can be suppressed by shifting the parallel resonance frequency of the reception antenna.

The waveform stabilizer may be enabled when an output current of the wireless power receiver is more than a predetermined threshold. This processing is effective when reception power and transmission power increase and an inverter in the wireless power transmitter transfers to an operation mode in which it is easy to cause the waveform disturbance.

The waveform stabilizer may be enabled when an output current of the wireless power receiver is included in a predetermined range. This processing is effective when the reception power and the transmission power are included in a certain range and the inverter in the wireless power transmitter transfers to the operation mode in which it is easy to cause the waveform disturbance.

The waveform stabilizer may be enabled when load power of the wireless power receiver is included in a predetermined range.

The rectification circuit may include an H bridge circuit which has a first alternating-current input terminal and a second alternating-current input terminal connected to the reception antenna and a synchronous rectification controller which controls the H bridge circuit.

When an output current of the wireless power receiver is smaller than a predetermined threshold, the synchronous rectification controller may control the H bridge circuit in a semi-synchronous rectification mode and when the output current is larger than the predetermined threshold, the synchronous rectification controller may control the H bridge circuit in a full-synchronous rectification mode, and when the H bridge circuit is operated in the full-synchronous rectification mode, the waveform stabilizer may be enabled.

The waveform stabilizer includes a first capacitor and a first switch which are provided in series between one end of the reception antenna and a ground and a second capacitor and a second switch which are provided in series between the other end of the reception antenna and the ground and turns on the first switch and the second switch in an enabled state.

In the waveform stabilizer, terminals of low potential sides of the first switch and the second switch may be connected to a common node, and the waveform stabilizer further may include a resistor which is provided between the common node and the ground. A shift amount of the parallel resonance frequency can be determined according to a resistance value of the resistor.

The waveform stabilizer may further include a first resistor which is provided in series with the first capacitor and the first switch between one end of the reception antenna and the ground and a second resistor which is provided in series with the second capacitor and the second switch between the other end of the reception antenna and the ground.

The wireless power receiver may further include an AM modulator which is connected to the reception antenna and changes the parallel resonance frequency of the reception antenna according to an AM modulation signal. The waveform stabilizer may be configured to share at least a part with the AM modulator. Hardware of the AM modulator is used, so that a circuit area can be suppressed from increasing.

The wireless power receiver may correspond to a Qi standard.

Another embodiment of the present invention relates to an electronic apparatus. The electronic apparatus may include the wireless power receiver described above.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a "state in which a member A is connected to a member B" includes a state in which the member A is indirectly connected to the member B via another member, not substantially affecting a state of electric connection thereof or impairing a function and an effect achieved by coupling thereof, in addition to a state in which the member A is physically and directly connected to the member B.

Similarly, a "state in which a member C is provided between the member A and the member B" includes a state in which the member A is indirectly connected to the member C via another member or the member B is indirectly connected to the member C via another member, not substantially affecting a state of electric connection thereof or impairing a function and an effect achieved by coupling thereof, in addition to a state in which the member A is directly connected to the member C or the member B is directly connected to the member C.

First Embodiment

Figure 1:
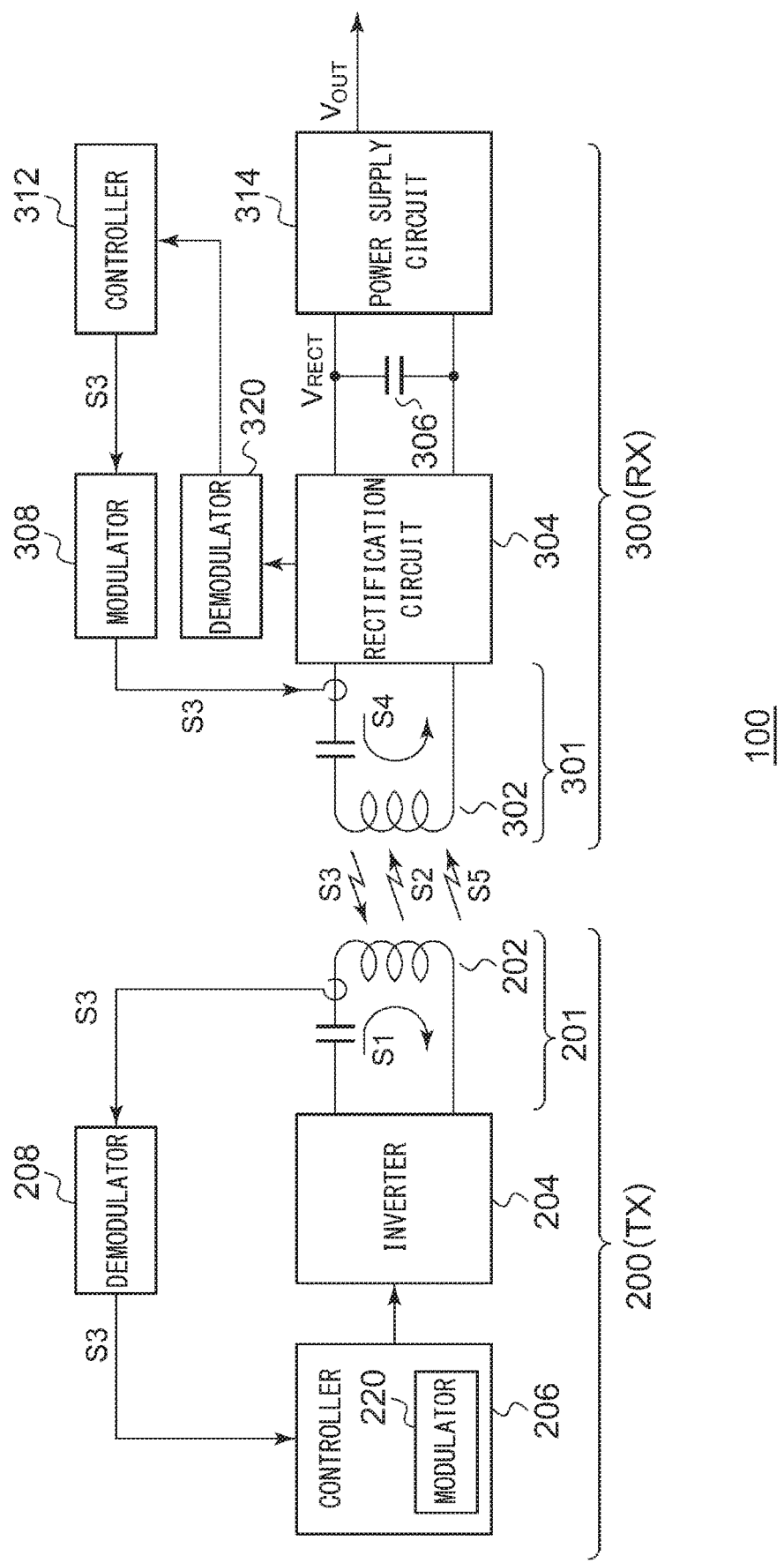
FIG. 1 is a diagram illustrating a configuration of a wireless power supply system corresponding to a Qi standard.
Figure 5:
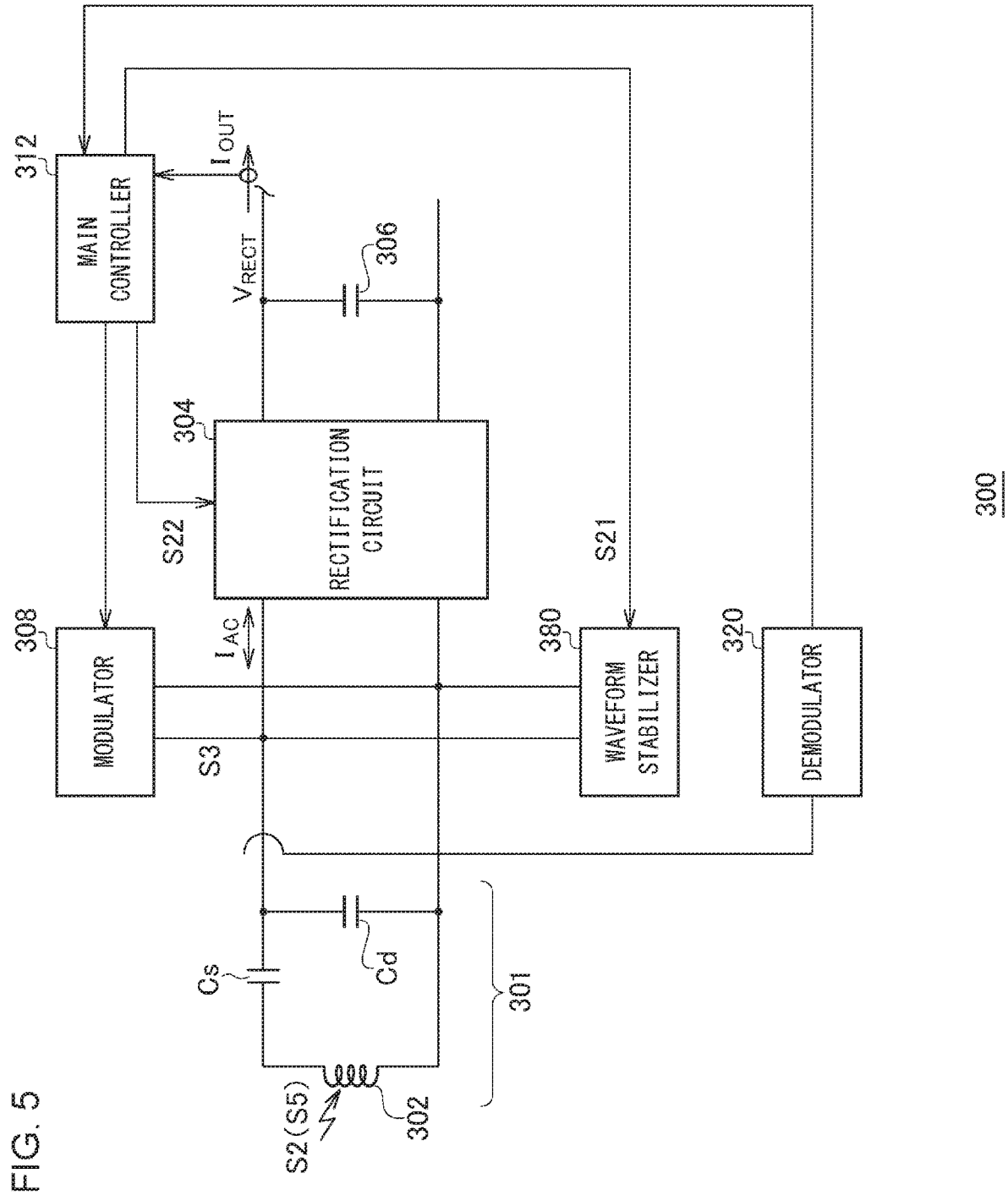
FIG. 5 is a circuit diagram of a power receiver according to a first embodiment.

FIG. 5 is a circuit diagram of a power receiver 300 according to a first embodiment. The power receiver 300 includes a waveform stabilizer 380 in addition to a power receiver 300r of FIG. 1. A reception antenna 301 includes a reception coil 302, a serial resonance capacitor Cs, and a parallel resonance capacitor Cd. A rectification circuit 304 rectifies an alternating current (AC) $I_{AC}$ flowing to the reception antenna 301. The rectification circuit 304 is connected to the reception antenna 301 via a first AC input (AC1) terminal and a second AC input (AC2) terminal and is a diode bridge circuit or a synchronous rectification circuit. A smoothing capacitor 306 smoothes an output of the rectification circuit 304. A demodulator 320 demodulates a power signal S2 on which an FSK signal S5 is superimposed.

The waveform stabilizer 380 is enabled when the power receiver 300 satisfies a predetermined condition and shifts a parallel resonance frequency of the reception antenna 301 in an enabled state. The predetermined condition may be determined to correspond to the possibility that disturbance occurs in voltage waveforms of the AC1 terminal and the AC2 terminal.

A parallel resonance frequency fd' after the shift may be determined to suppress disturbance of voltages $V_{AC1}$ and $V_{AC2}$ across the reception antenna 301 and is not limited to a specific value. An optimal value of the parallel resonance frequency fd' can be found by an experiment or a simulation.

A main controller generates a control signal S21 to switch enabling (on) and disabling (off) of the waveform stabilizer 380. In this embodiment, the waveform stabilizer 380 IS ENABLED WHEN AN OUTPUT CURRENT $I_{OUT}$ (ELECTRIC CURRENT FLOWING OUT FROM THE SMOOTHING capacitor 306) of the power receiver 300 is more than a predetermined threshold $I_{TH}$. The output current $I_{OUT}$ is Detected by a Current Sensor not Illustrated in the Drawings. If the output current $I_{OUT}$ is more than the threshold $I_{TH}$, the main controller asserts the control signal S21 and enables the waveform stabilizer 380.

If reception power and transmission power increase according to an increase in the output current $I_{OUT}$, an inverter in a wireless power transmitter transfers to an operation mode in which it is easy to cause waveform disturbance. For example, in a Qi standard for middle power (Power Class 0 Extended Power Profile), if the transmission power increases, an operation changes to a phase shift operation to control power, which may result in causing the waveform disturbance. Therefore, the parallel resonance frequency is controlled according to the magnitude of the output current $I_{OUT}$, so that the waveform disturbance of the AC1 terminal and the AC2 terminal is suitably suppressed, and in a situation where the possibility that the waveform disturbance occurs is low, the parallel resonance frequency can be maintained at a value regulated by the standard.

Figure 6A:
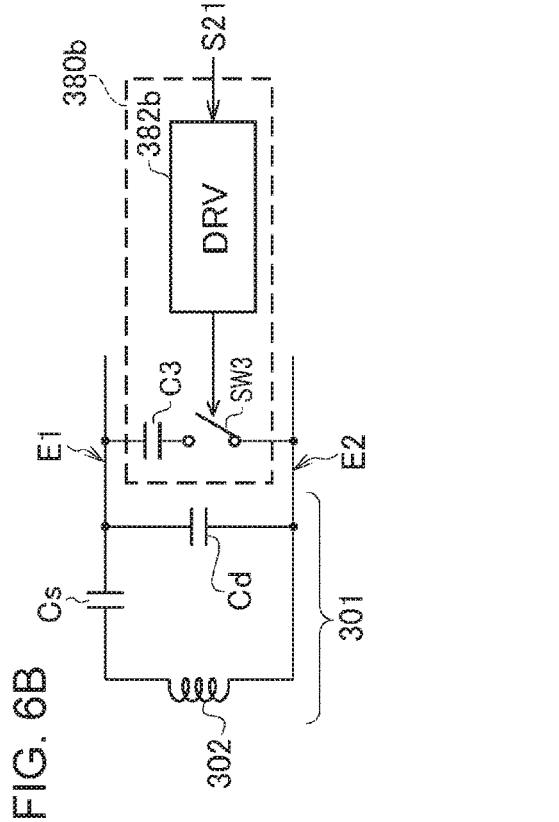
FIGS. 6A to 6D are circuit diagrams illustrating configuration examples of a waveform stabilizer.
Figure 6B:
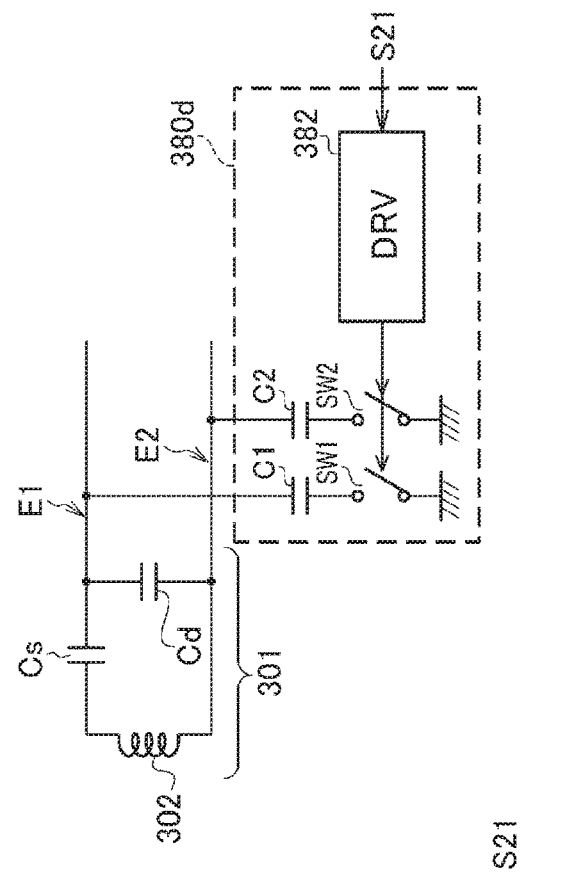
Figure 6C:
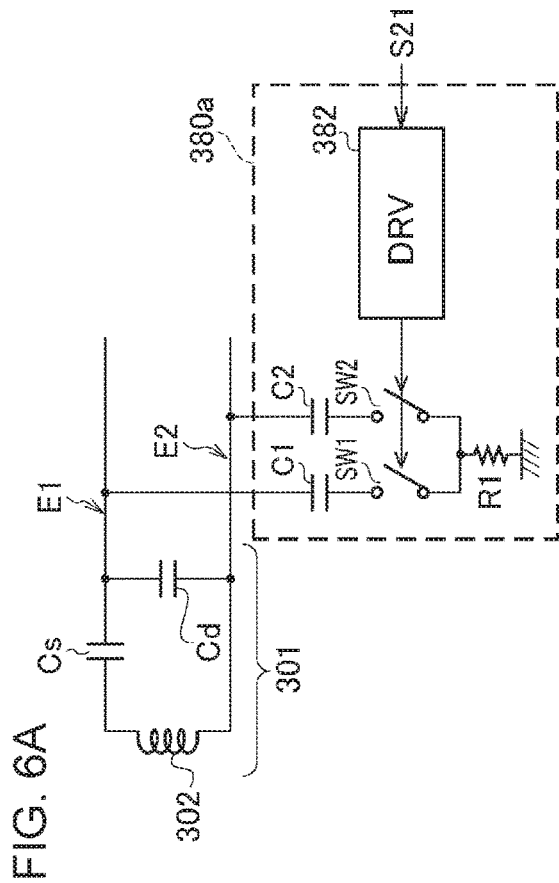
Figure 6D:
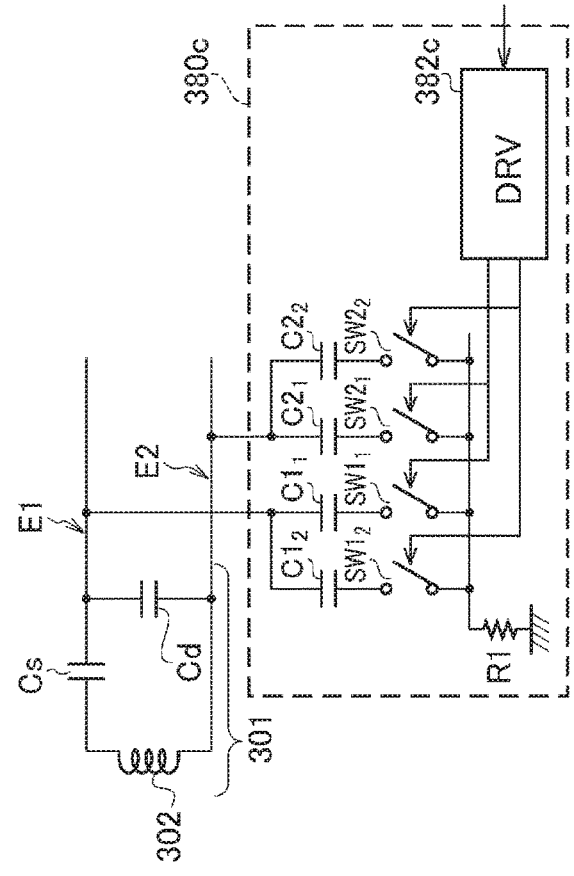

FIGS. 6A to 6D are circuit diagrams illustrating configuration examples of the waveform stabilizer 380. A waveform stabilizer 380a of FIG. 6A includes a first capacitor C1, a second capacitor C2, a first switch SW1, a second switch SW2, and a resistor R1. The first capacitor C1 and the first switch SW1 are provided in series between one end E1 of the reception antenna 301 and a ground. In addition, the second capacitor C2 and the second switch SW2 are provided in series between the other end E2 of the reception antenna 301 and the ground. The resistor R1 is inserted between a connection node of the first switch SW1 and the second switch SW2 and the ground. In addition, an arrangement of the resistor R1 is not limited in particular and a plurality of resistors may be provided. As illustrated in FIG. 6D, the resistor R1 may be omitted.

A driver 382 receives the control signal S21 from the main controller. The driver 382 turns on the first switch SW1 and the second switch SW2, when the control signal S21 is asserted. In addition, the driver 382 may be omitted and the first switch SW1 and the second switch SW2 may be driven directly using the control signal S21.

A waveform stabilizer 380b of FIG. 6B includes a switch SW3 and a capacitor C3. The switch SW3 and the capacitor C3 are provided in series between both ends E1 and E2 of the reception antenna 301 and in parallel with the capacitor Cd. A driver 382b turns on the switch SW3 when the control signal S21 is asserted. In addition, a resistor may be inserted in series with the capacitor C3 and the switch SW3.

A waveform stabilizer 380c of FIG. 6C is a modification of the waveform stabilizer 380a of FIG. 6A and capacities of the first capacitor C1 and the second capacitor C2 are varied. A plurality of (in FIG. 6C, two) series connection circuits of the capacitors C1 and the switches SW1 are provided in parallel between one end E1 of the reception antenna 301 and the ground. Likewise, a plurality of series connection circuits of the capacitors C2 and the switches SW2 are provided in parallel between the other end E2 of the reception antenna 301 and the ground. According to this configuration, a parallel resonance frequency can be switched with a plurality of values and an appropriate parallel resonance frequency can be selected during FSK communication according to an operation situation of a power supply system 100. Therefore, the waveform disturbance can be further suppressed. Even in FIG. 6C, the resistor R1 may be omitted.

Figure 7A:
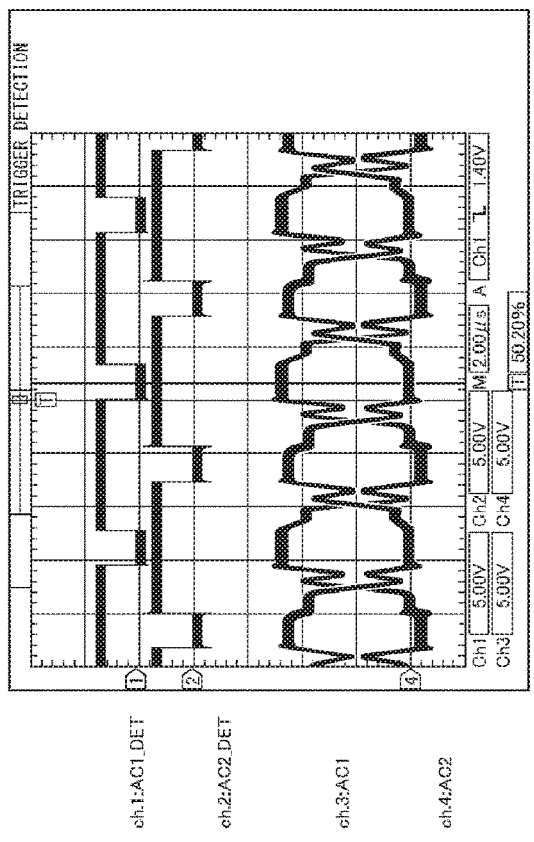
FIGS. 7A to 7C are waveform diagrams when an output current $I_{OUT}$ is changed to 0 mA, 50 mA, and 100 mA.
Figure 7A:
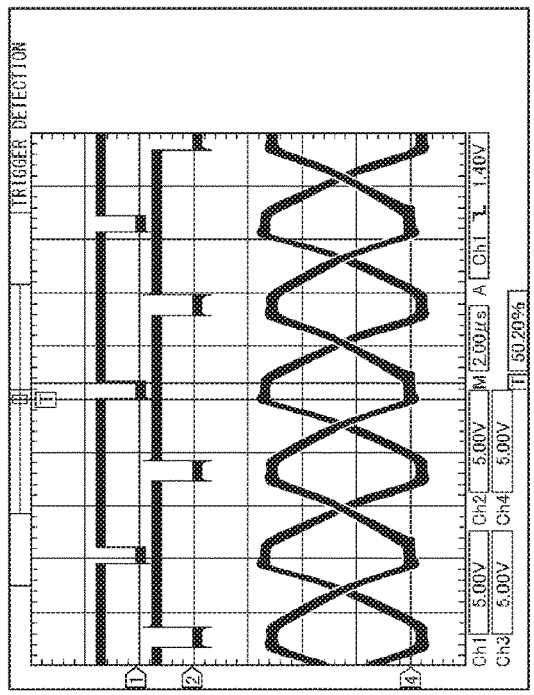
Figure 7B:
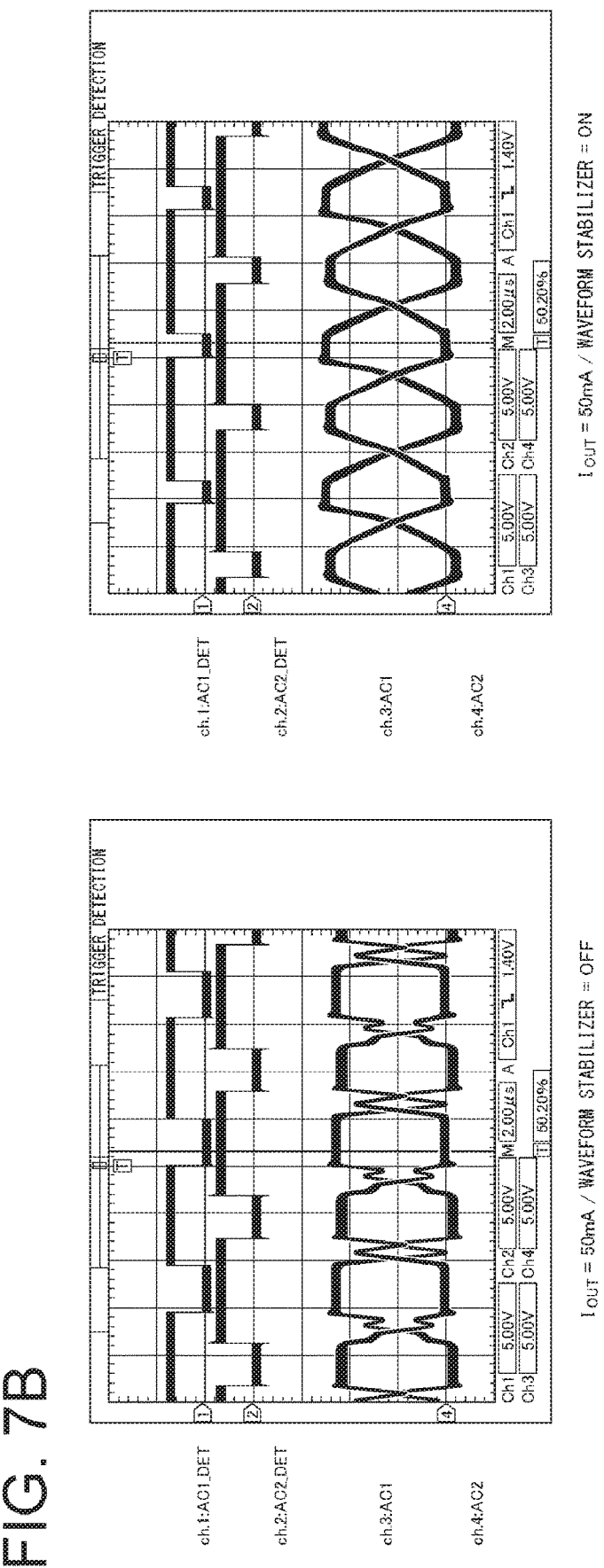
Figure 7C:
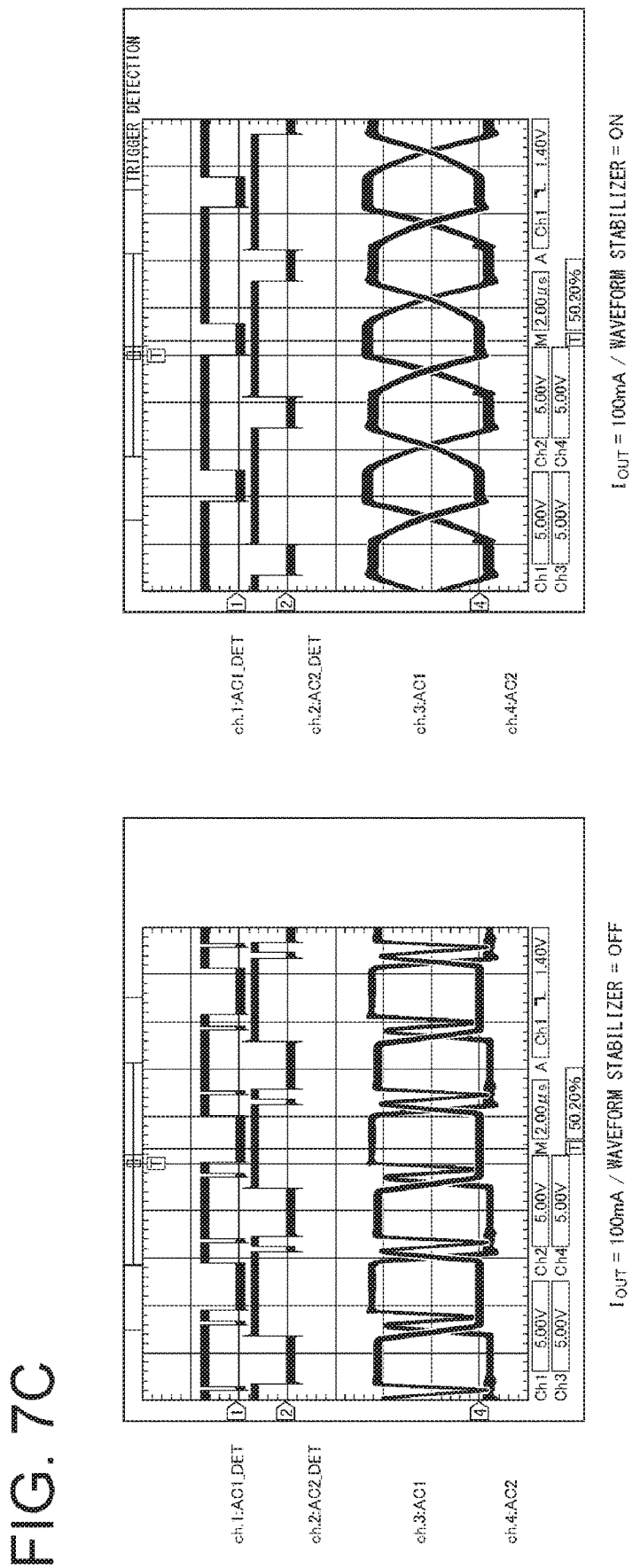

The above is the configuration of the power receiver 300. Next, an operation of the power receiver 300 will be described. FIGS. 7A to 7C are waveform diagrams when the output current $I_{OUT}$ is changed to 0 mA, 50 mA, and 100 mA. In the individual drawings, a left waveform diagram illustrates a waveform when the waveform stabilizer 380 is disabled and a right waveform diagram illustrates a waveform when the waveform stabilizer 380 is enabled. Referring to the left waveform diagrams of FIGS. 7A to 7C, when the output current $I_{OUT}$ increases, amplitude of the waveform disturbance (ringing) increases. Even in any case, the waveform stabilizer 380 is enabled, so that the disturbance of the waveform can be suppressed as illustrated in the right waveform diagrams.

As a result of suppression of the waveform disturbance, an error of FSK demodulation can be reduced. In addition, when the rectification circuit 304 is a synchronous rectification circuit, zero current switching can be maintained.

If the ringing occurs in the voltages $V_{AC1}$ and $V_{AC2}$, a jump may occur in a rectification voltage $V_{RECT}$. In the power receiver 300 according to the embodiment, stability of the rectification voltage $V_{RECT}$ can be raised.

In FIG. 7A or 7B, even though the ringing occurs in the voltage of the AC1 terminal and the voltage of the AC2 terminal, outputs AC1_DET and AC2_DET to be comparison results with the threshold are generated definitely. As illustrated in FIG. 7C, when $I_{OUT}$=100 mA is set, an influence of the ringing appears in an AC1_DET signal and an AC2_DET signal. Therefore, as described above, the waveform stabilizer 380 is turned on in only the case in which the output current $I_{OUT}$ is more than the threshold current $I_{TH}$ and the waveform stabilizer 380 is turned off in the case in which the output current $I_{OUT}$ is lower than the threshold current $I_{TH}$, that is, a situation where an influence of the waveform disturbance is not serious. As a result, the parallel resonance frequency of the reception antenna 301 can be maintained at the value regulated by the standard.

The present invention extends to various apparatuses and circuits grasped as the block diagram or the circuit diagram of FIG. 5 or derived from the above description and is not limited to a specific configuration. Hereinafter, more concrete configuration example and embodiment will be described to help understanding of the nature of the invention or a circuit operation and to clarify them, not to narrow a range of the present invention.

Figure 8:
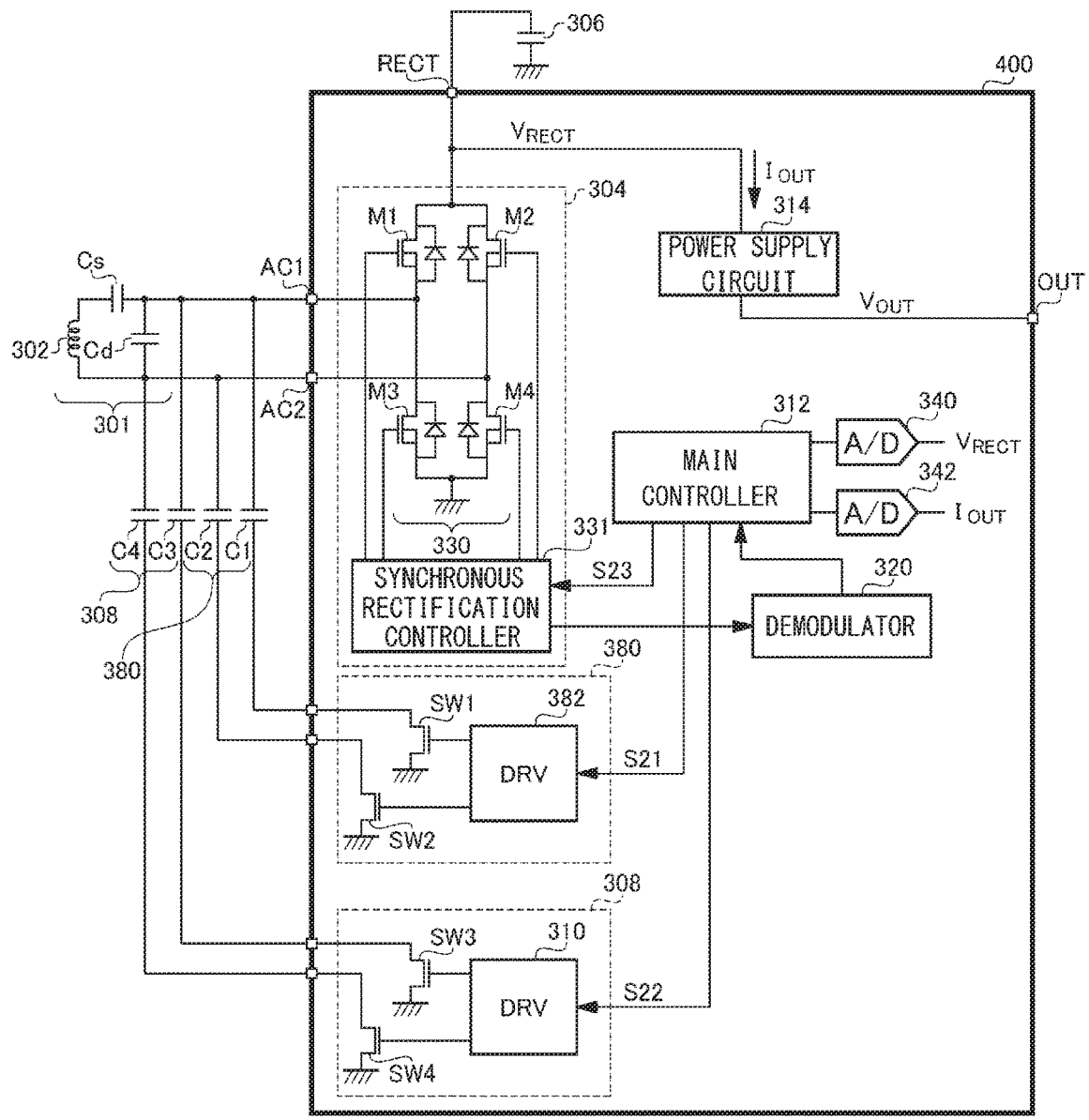
FIG. 8 is a circuit diagram illustrating a configuration example of the power receiver.

FIG. 8 is a circuit diagram illustrating a configuration example of the power receiver 300. The power receiver 300 includes a reception antenna 301, a smoothing capacitor 306, and a reception control IC 400. The reception control IC 400 is a functional IC where a rectification circuit 304, a modulator 308, a main controller 312, a power supply circuit 314, and a demodulator 320 are integrated.

The main controller 312 is a logic circuit that controls the whole power receiver 300 generally. The main controller 312 can perform communication with the power transmitter 200 using the modulator 308 and the demodulator 320. Various internal information of the reception control IC 400 is input to the main controller 312. For example, A/D converters 340 and 342 convert the rectification voltage $V_{RECT}$ and the output current $I_{OUT}$ into digital values, respectively, and supply the digital values to the main controller 312. The main controller 312 includes the following functions.

The main controller 312 sets a target value (DP: Desired Point) of the rectification voltage $V_{RECT}$, on the basis of a measurement value of the output current $I_{OUT}$.

The main controller 312 generates control error (CE) packets according to an error of the target value DP and the rectification voltage $V_{RECT}$ and outputs a modulation signal S22 including the CE packets to the modulator 308.

The main controller 312 generates a control signal S21 indicating enabling and disabling of the waveform stabilizer 380, on the basis of the output current $I_{OUT}$.

The main controller 312 generates a control signal S23 indicating an operation mode (a semi-synchronous rectification mode and a full-synchronous rectification mode) of the rectification circuit 304, on the basis of the output current $I_{OUT}$.

The main controller 312 operates reception power, on the basis of the output current Iour and the rectification voltage $V_{RECT}$.

The functions of the main controller 312 are not limited thereto.

Figure 2:
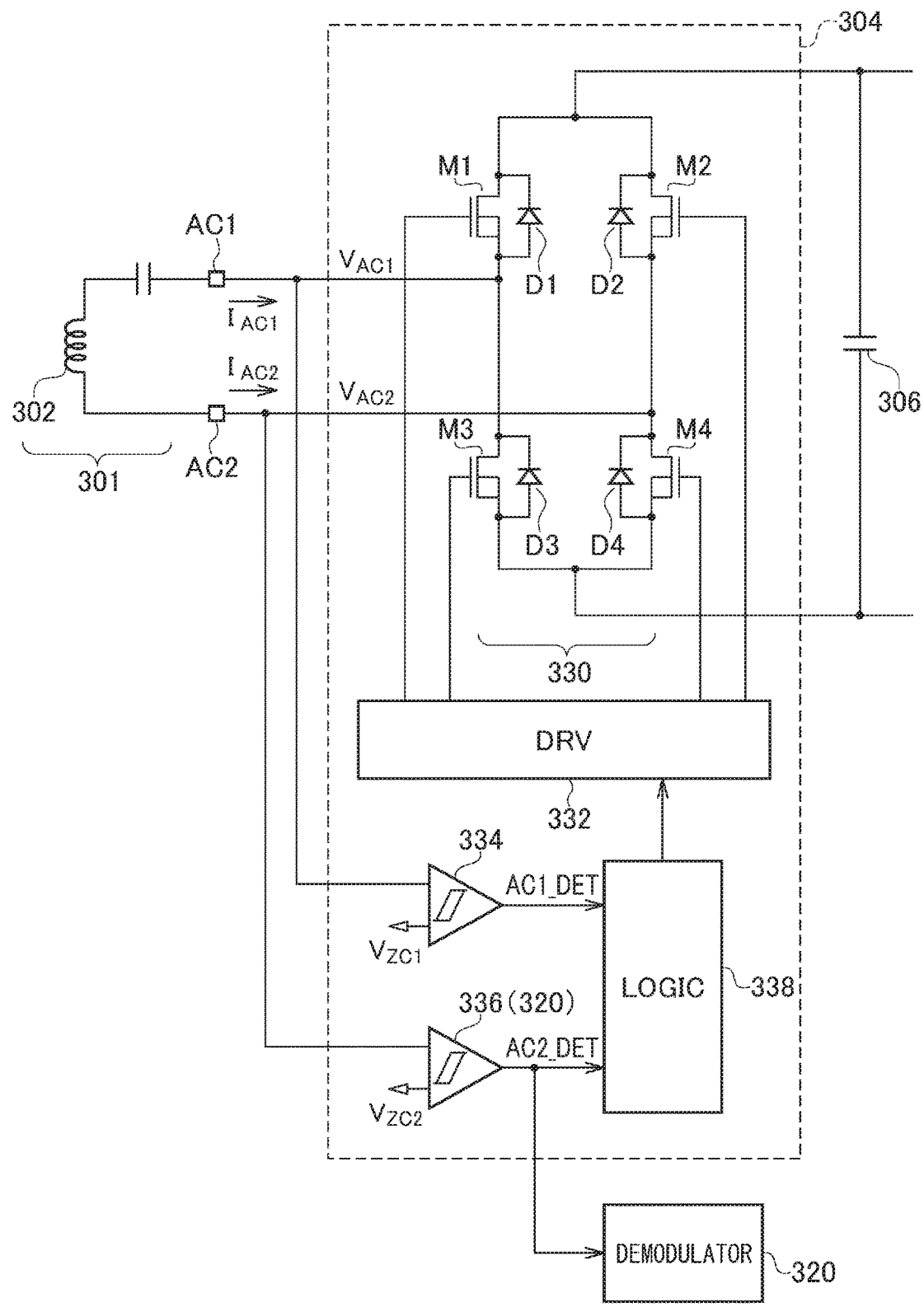
FIG. 2 is a circuit diagram of a rectification circuit and a demodulator examined by the present inventors.
Figure 3:
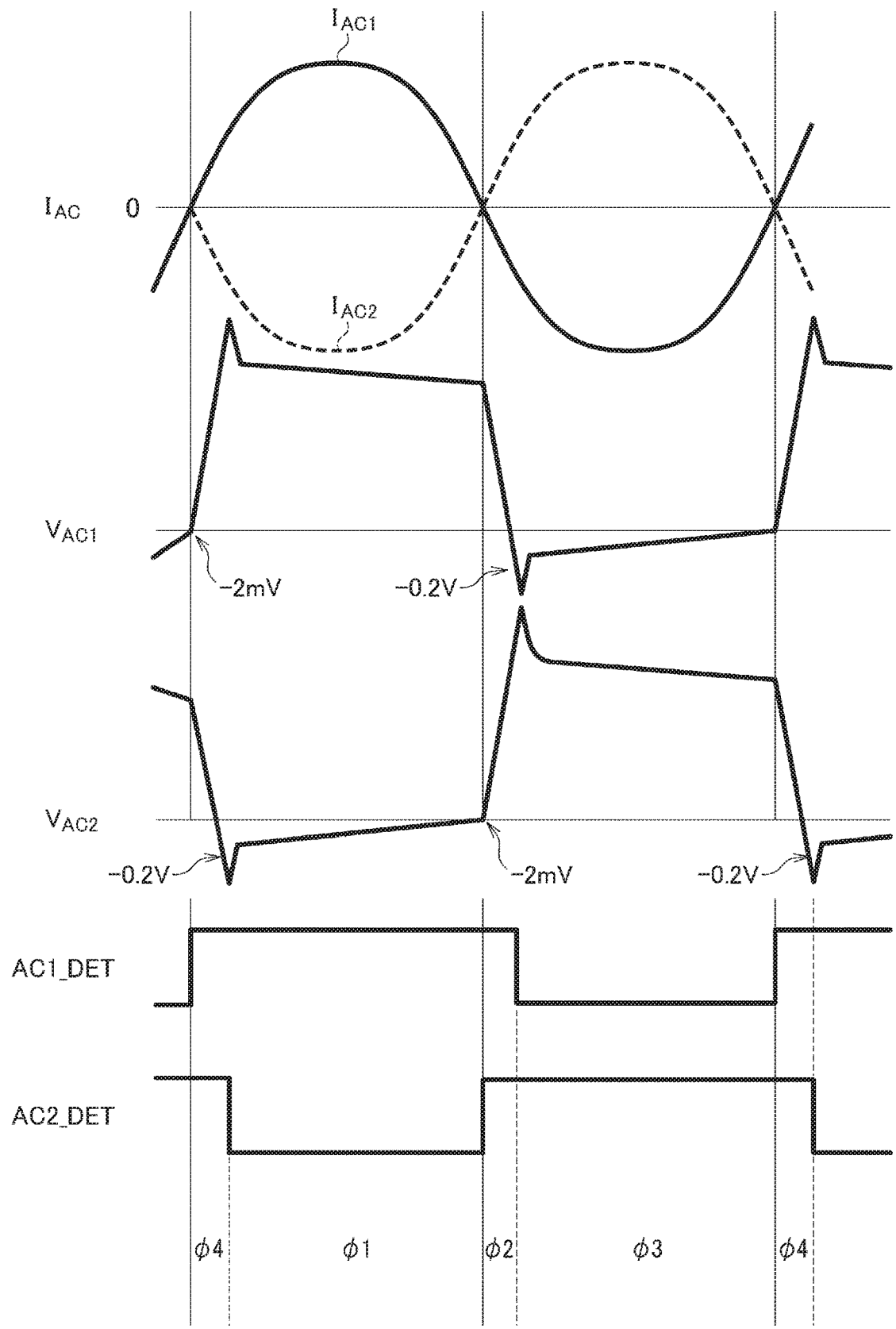
FIG. 3 is an operation waveform diagram of the rectification circuit.
Figure 4A:
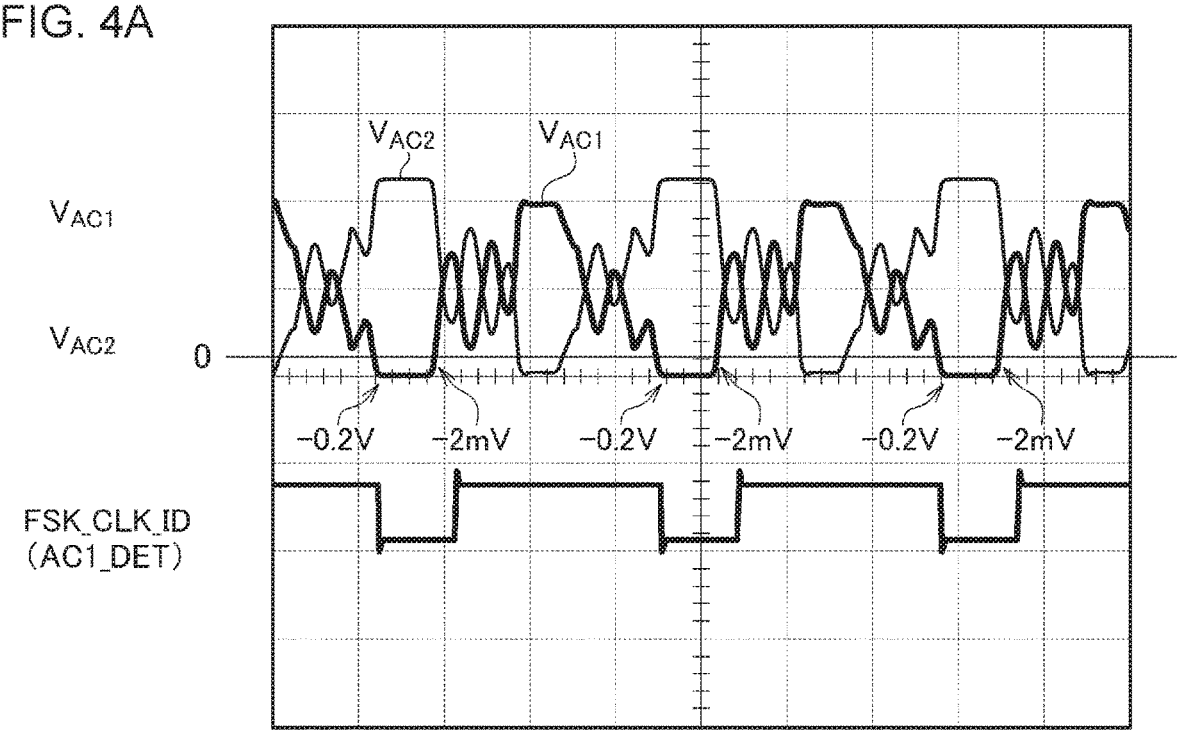
FIGS. 4A and 4B are operation waveform diagrams of the rectification circuit of FIG. 2.
Figure 4B:
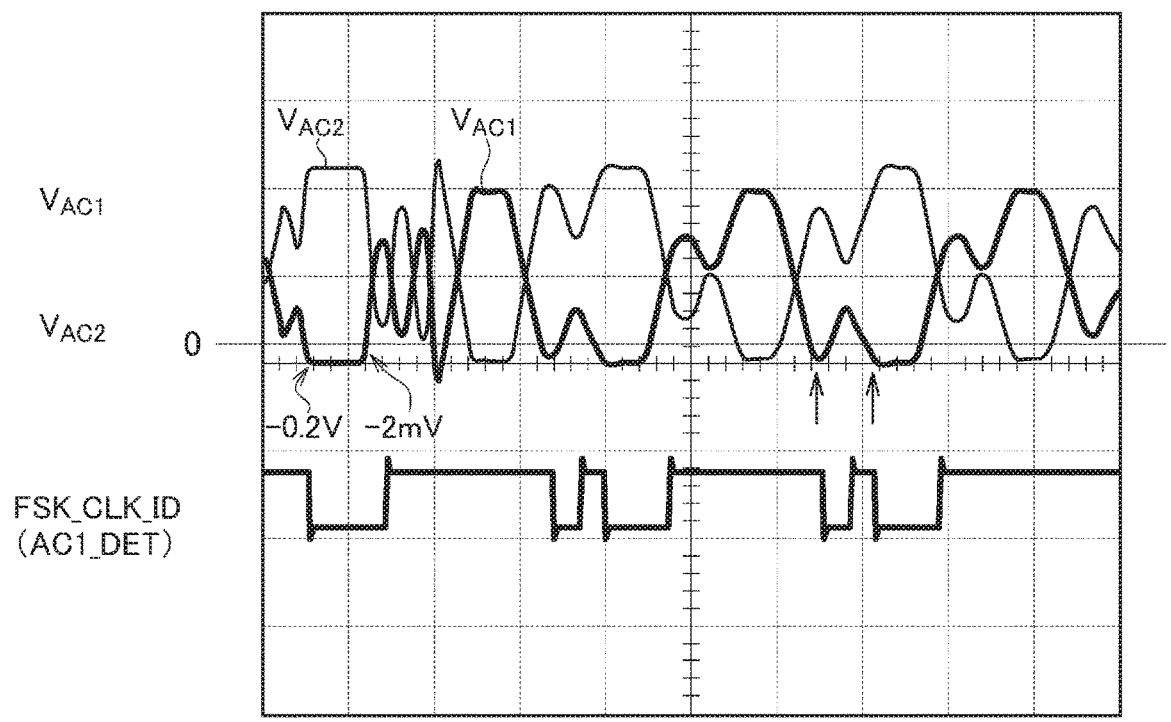

The rectification circuit 304 includes an H bridge circuit 330 and a synchronous rectification controller 331. A configuration of the synchronous rectification controller 331 is as illustrated in FIG. 2 and the synchronous rectification controller 331 includes a driver 332, a first comparator 334, a second comparator 336, and a logic circuit 338. The synchronous rectification controller 331 drives the H bridge circuit 330 in a mode indicated by the control signal S23. In the semi-synchronous rectification mode, only transistors M3 and M4 of a low side of the H bridge circuit 330 are switched and transistors of a high side are fixed to off.

The main controller 312 may link enabling/disabling of the waveform stabilizer 380 with an operation mode of the rectification circuit 304. That is, when the output current $I_{OUT}$ is smaller than the predetermined threshold $I_{TH}$, the main controller 312 sets the rectification circuit 304 to the semi-synchronous rectification mode and disables the waveform stabilizer 380. In contrast, when the output current $I_{OUT}$ is larger than the predetermined threshold $I_{TH}$, the main controller 312 sets the rectification circuit 304 to the full-synchronous rectification mode and enables the waveform stabilizer 380.

The main controller generates the control signal S21 for the waveform stabilizer 380 and the control signal S23 for the rectification circuit 304, on the basis of a comparison result of the output current $I_{OUT}$ and the threshold $I_{TH}$.

The waveform stabilizer 380 of FIG. 8 has the same configuration as the configuration illustrated in FIG. 6D, but may have other configuration. The modulator 308 has the same configuration as the configuration of the waveform stabilizer 380 and includes a third capacitor C3, a fourth capacitor C4, a third switch SW3, a fourth switch SW4, and a driver 310 to be attached externally. The driver 310 switches the third switch SW3 and the fourth switch SW4 on the basis of the AM modulation signal S22.

If the waveform stabilizer 380 is enabled and the parallel resonance frequency of the reception antenna 301 is shifted, a modulation degree of AM modulation by the modulator 308 may decrease. In this case, the main controller 312 preferably disables the waveform stabilizer 380 during an AM modulation period of the modulator 308. When a sufficient modulation degree can be secured by optimizing capacity values of the capacitors Cs, Cd, and C1 to C4, the waveform stabilizer 380 is enabled during the modulation period of the modulator 308.

When the power receiver 300 corresponds to the Qi standard, position detection of the power receiver 300 may be performed by the power transmitter 200 in an analog Ping phase. In the case of the power transmitter 200 of a moving coil system, the position detection is not limited to the analog Ping phase and the position detection is performed before a digital Ping phase. In the position detection, it is required that the parallel resonance frequency of the reception antenna 301 is the value determined by the standard. Therefore, in the Qi standard, the waveform stabilizer 380 is preferably disabled surely until the position detection is completed.

(Application)

Figure 9:
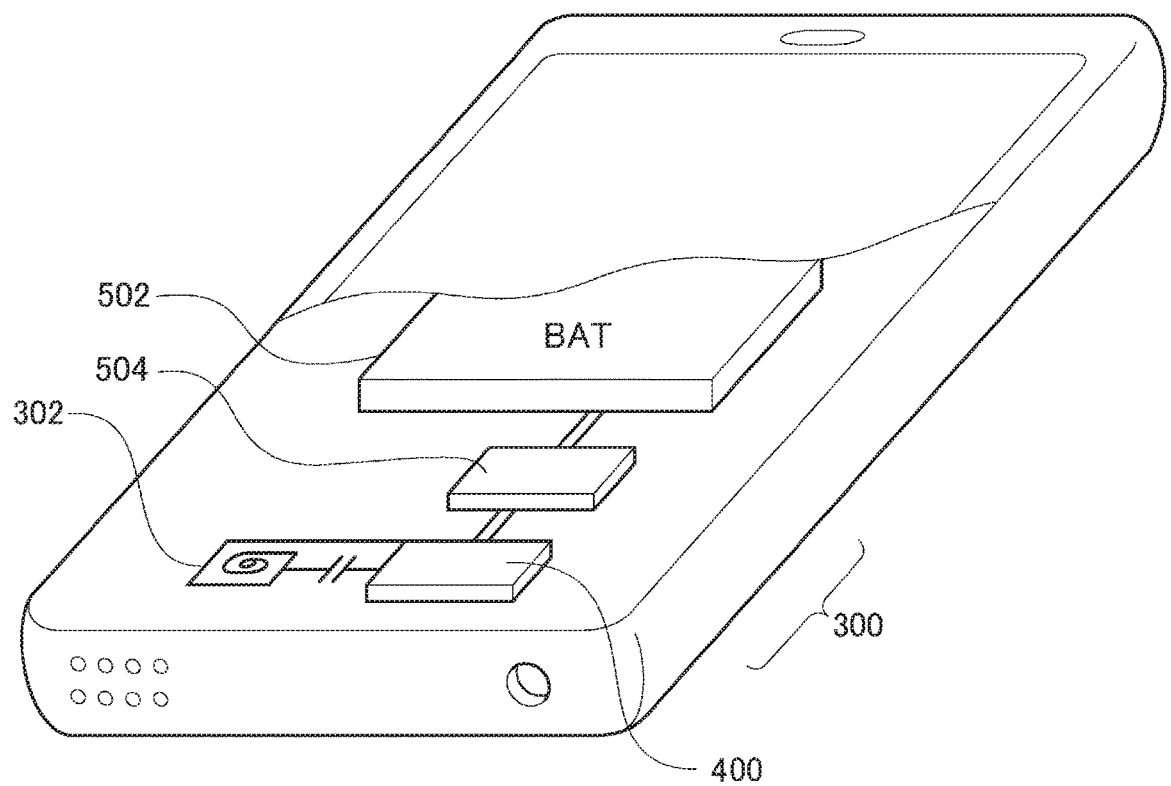
FIG. 9 is a perspective view of an electronic apparatus including the power receiver.

An application of the power receiver 300 will be described. FIG. 9 is a perspective view of an electronic apparatus 500 including the power receiver 300. The electronic apparatus 500 is a battery-driven device such as a mobile phone terminal, a laptop computer, a smart phone, a tablet terminal, a portable audio player, a digital camera, and a digital video camera. The electronic apparatus 500 includes a secondary battery 502 and a charging circuit 504, in addition to the power receiver 300. The charging circuit 504 receives the output voltage $V_{OUT}$ generated by the power receiver 300 and charges the secondary battery 502.

The present invention has been described on the basis of the embodiment. However, it should be understood by those skilled in the art that the embodiment is only exemplary, various modifications can be made in combinations of the individual components or the individual processes, and the modifications are also included in a range of the present invention. Hereinafter, the modifications will be described.

First Modification

Figure 10:
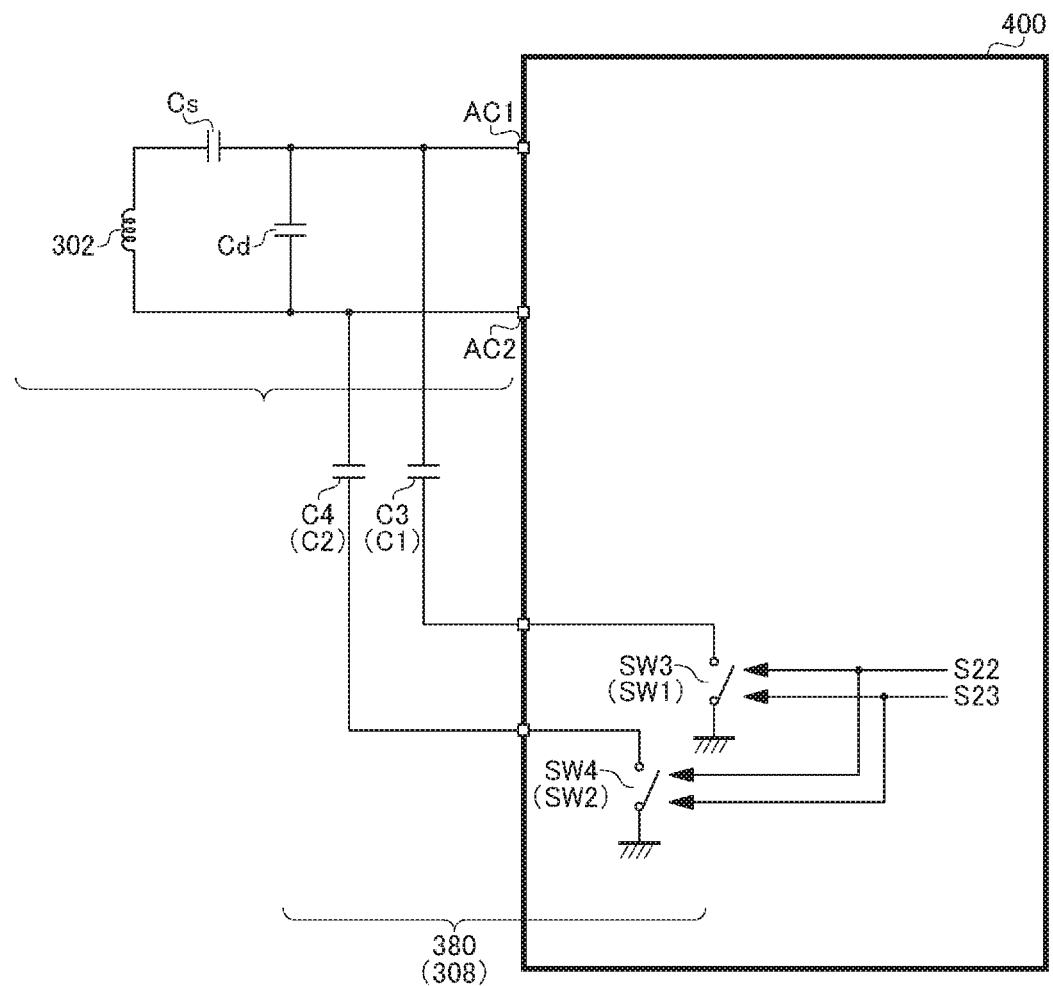
FIG. 10 is a circuit diagram of a waveform stabilizer and a modulator according to a first modification.

FIG. 10 is a circuit diagram of a waveform stabilizer 380 and a modulator 308 according to a first modification. As illustrated in FIG. 10, both the waveform stabilizer 380 and the modulator 308 shift a parallel resonance frequency and circuit configurations thereof are shared. Therefore, the waveform stabilizer 380 and the modulator 308 are configured to share a part of a circuit element. In this modification, capacitors C3 and C4 and switches SW3 and SW4 of the modulator 308 function as capacitors C1 and C2 and switches SW1 and SW2 of the waveform stabilizer 380. According to this modification, a circuit area can be suppressed from increasing.

Second Modification

In the embodiment, on and off of the waveform stabilizer 380 are controlled on the basis of the output current $I_{OUT}$. However, on and off of the waveform stabilizer 380 may be controlled on the basis of output power of the power receiver 300, that is, reception power of the power receiver 300.

Third Modification

In the embodiment, the wireless power transmitter corresponding to the Qi standard is described. However, the present invention is not limited thereto and is applicable to the power receiver 300 used in a system similar to the Qi standard or the power receiver 300 corresponding to a standard to be formulated in the future.

Fourth Modification

The allocation of the high level and the low level of each signal described in the embodiment is only exemplary and can be easily changed by those skilled in the art.

While the preferred embodiments of the present invention have been described using specific terms, such description is for illustrative purposes only, and it is to be understood that changes and variations may be made without departing from the spirit or scope of the appended claims.

What is claimed is:

1. A wireless power receiver structured to receive a power signal from a wireless power transmitter, the wireless power receiver comprising:

a reception antenna having a reception coil structured to receive the power signal;
a rectification circuit having a first AC input terminal and a second AC input terminal coupled to both ends of the reception antenna, and structured to rectify an alternating current flowing through the reception antenna;
a smoothing capacitor structured to smooth an output of the rectification circuit;
a waveform stabilizer structured to be enabled in responsive to assertion of the control signal and to shift a parallel resonance frequency of the reception antenna so as to suppress waveform disturbance which occurs in voltages at the first AC input terminal and the second AC input terminal;
a current sensor structured to detect an output current of the wireless power receiver; and
a main controller structured to receive an output of the current sensor and to generate the control signal which is asserted when the output current is larger than a predetermined threshold,
wherein the waveform stabilizer includes
a first capacitor and a first switch which are provided in series between the first AC input terminal and a ground;
a second capacitor and a second switch which are provided in series between the second AC input terminal and the ground; and
a driver structured to turn on the first switch and the second switch for enabling the waveform stabilizer.

2. The wireless power receiver according to claim 1, wherein
the rectification circuit includes an H bridge circuit which has a first alternating-current input terminal and a second alternating-current input terminal connected to the reception antenna and a synchronous rectification controller which controls the H bridge circuit.

3. The wireless power receiver according to claim 2, wherein
when an output current of the wireless power receiver is smaller than a predetermined threshold, the synchronous rectification controller controls the H bridge circuit in a semi-synchronous rectification mode and when the output current is larger than the predetermined threshold, the synchronous rectification controller controls the H bridge circuit in a full-synchronous rectification mode, and
when the H bridge circuit is operated in the full-synchronous rectification mode, the waveform stabilizer is enabled.

4. The wireless power receiver according to claim 1, wherein
terminals of low potential sides of the first switch and the second switch are connected to a common node, and
the waveform stabilizer further includes a resistor which is provided between the common node and the ground.

5. The wireless power receiver according to claim 1, wherein
the waveform stabilizer further includes a first resistor which is provided in series with the first capacitor and the first switch between one end of the reception antenna and the ground and a second resistor which is provided in series with the second capacitor and the second switch between the other end of the reception antenna and the ground.

6. The wireless power receiver according to claim 1, further comprising:

an AM modulator which is connected to the reception antenna and changes the parallel resonance frequency of the reception antenna according to an AM modulation signal.

7. The wireless power receiver according to claim 6, wherein
the waveform stabilizer is configured to share at least a part with the AM modulator.

8. The wireless power receiver according to claim 6, wherein
the waveform stabilizer is structured to be disabled in an operation section of the AM modulator.

9. The wireless power receiver according to claim 1, wherein
the waveform stabilizer is structured to be not enabled before position detection by the wireless power transmitter is completed.

10. The wireless power receiver according to claim 1, wherein
the wireless power receiver corresponds to a Qi standard.

11. An electronic apparatus including a wireless power receiver structured to receive a power signal from a wireless power transmitter, the wireless power receiver comprising:
a reception antenna having a reception coil structured to receive the power signal;
a rectification circuit having a first AC input terminal and a second AC input terminal coupled to both ends of the reception antenna, and structured to rectify an alternating current flowing through the reception antenna;
a smoothing capacitor structured to smooth an output of the rectification circuit;
a waveform stabilizer structured to be enabled in responsive to assertion of the control signal and to shift a parallel resonance frequency of the reception antenna so as to suppress waveform disturbance which occurs in voltages at the first AC input terminal and the second AC input terminal;
a current sensor structured to detect an output current of the wireless power receiver; and
a main controller structured to receive an output of the current sensor and to generate the control signal which is asserted when the output current is larger than a predetermined threshold,
wherein the waveform stabilizer includes
a first capacitor and a first switch which are provided in series between the first AC input terminal and a ground;
a second capacitor and a second switch which are provided in series between the second AC input terminal and the ground; and
a driver structured to turn on the first switch and the second switch for enabling the waveform stabilizer.

12. A power reception control circuit used in a wireless power receiver, the power reception control circuit comprising:
a first alternating-current input terminal and a second alternating-current input terminal which are connected to a reception antenna receiving a power signal from a wireless power transmitter;
a rectification circuit which includes having a first AC input terminal and a second AC input terminal coupled to both ends of the reception antenna and is connected to the first alternating-current input terminal and the second alternating-current input terminal and structured to rectify an alternating current flowing to the reception antenna;

a rectification terminal to which a smoothing capacitor smoothing an output of the rectification circuit is connected;

a waveform stabilizer structured to be enabled in responsive to assertion of the control signal and to shift a parallel resonance frequency of the reception antenna so as to suppress waveform disturbance which occurs in voltages at the first AC input terminal and the second AC input terminal;

a current sensor structured to detect an output current of the wireless power receiver; and a main controller structured to receive an output of the current sensor and to generate the control signal which is asserted when the output current is larger than a predetermined threshold, wherein the waveform stabilizer includes:
  a first capacitor and a first switch which are provided in series between the first alternating-current input terminal and a ground;
  a second capacitor and a second switch which are provided in series between the second alternating-current input terminal and the ground; and
  a driver structured to turn on the first switch and the second switch for enabling the waveform stabilizer.

13. A control method for a wireless power receiver receiving a power signal from a wireless power transmitter, the control method comprising:

receiving the power signal by a reception antenna including a reception coil;

rectifying, by a rectification circuit, an alternating current flowing to the reception antenna by a rectification circuit;

smoothing an output of the rectification circuit;

shifting, by a waveform stabilizer, a parallel resonance frequency of the reception antenna;

detecting, by a current sensor, an output current of the wireless power receiver; and receiving an output of the current sensor and generating the control signal which is asserted, by a main controller, when the output current is larger than a predetermined threshold, wherein the rectification circuit has a first AC input terminal and a second AC input terminal coupled to both ends of the reception antenna, and the waveform stabilizer includes:
  a first capacitor and a first switch which are provided in series between the first AC input terminal and a ground;
  a second capacitor and a second switch which are provided in series between the second AC input terminal and the ground; and
  a driver structured to turn on the first switch and the second switch for enabling the waveform stabilizer in responsive to assertion of the control signal so as to suppress waveform disturbance which occurs in voltages at the first AC input terminal and the second AC input terminal.

14. The wireless power receiver according to claim 6, wherein the main controller is structured to generate control error (CE) packets according to an error of the output voltage of the rectification circuit and its target value, and to supply the AM modulation signal including the control error packets to the AM modulator.

* * * * *